(No Model.)
G. H. CANFIELD.
SIDE BAR COUPLING FOR CARRIAGES.
No. 467,635. Patented Jan. 26, 1892.
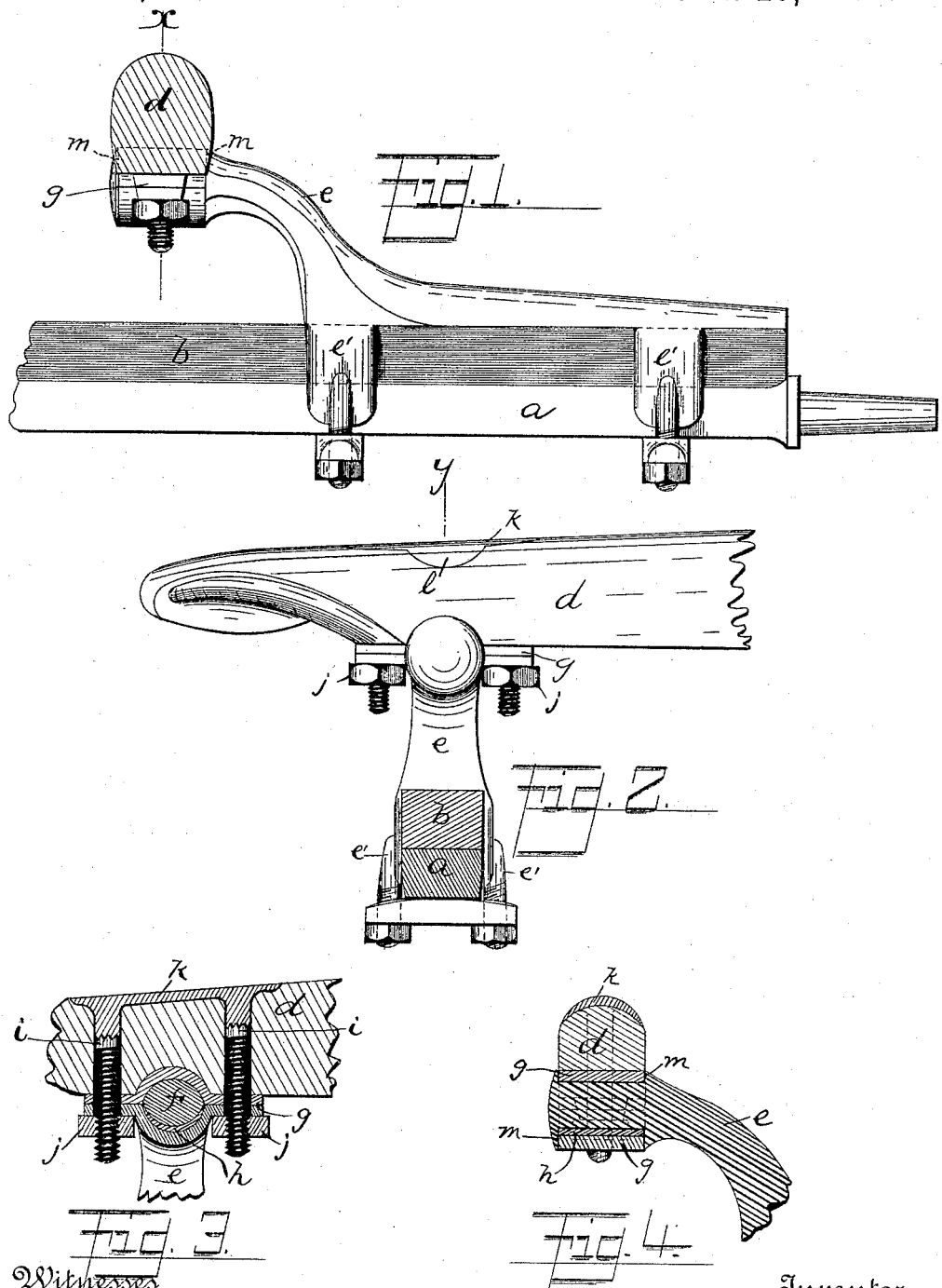

UNITED STATES PATENT OFFICE.

GEORGE H. CANFIELD, OF NEWARK, NEW JERSEY.

SIDE-BAR COUPLING FOR CARRIAGES.

SPECIFICATION forming part of Letters Patent No. 467,635, dated January 26, 1892.

Application filed August 22, 1891. Serial No. 403,419. (No model.)

*To all whom it may concern:*

Be it known that I, GEORGE H. CANFIELD, a citizen of the United States, residing at Newark, in the county of Essex and State of New Jersey, have invented certain new and useful Improvements in Side-Bar Couplings for Carriages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure freedom of action of the side bars and to remove the strain from the clips, thereby avoiding the necessity of frequent and more or less expensive repairs inherent in the ordinary couplings and causing the carriage to ride much easier than heretofore, and to secure other advantages hereinafter referred to.

The invention consists in the improved coupling devices and in the arrangement and combination of the several parts thereof as herein set forth, and finally pointed out in the claims.

Referring to the accompanying drawings, in which similar letters of reference indicate corresponding parts in each of the several figures where they occur, Figure 1 represents in elevation a portion of an axle-tree of a light carriage and a side bar in section secured thereto by my improved coupling device, and Fig. 2 is a side elevation of the same. Fig. 3 is a vertical section taken through line x of Fig. 1, and Fig. 4 is a vertical section taken through line y of Fig. 1.

In said drawings, a indicates one of the axles of a carriage, b the bed-piece, and d one of the side bars of said carriage.

In carrying out my invention I employ supports e, which are firmly secured to the bed-piece, bolster, or axle by means of ordinary clips e', and are provided with a round or oval bearing f (in the present case oval) to receive the side bars. Said side bars are provided with boxes g, having a seat or bearings corresponding with those of the supports e, except that allowance may be made for the insertion of a rubber or elastic cushion h in cases where it is found desirable to use them to prevent rattling. Said boxes are firmly secured to the side bars in the present case by bolts i and nuts j, said bolts being connected by an oblong head k, having lips l, which are embedded in the bar and finished flush therewith, the lips serving to prevent the bar from splitting. Said boxes are nicely fitted between shoulders m m at the extremities of the bearings f, so as to prevent the parts from rattling.

It will be observed that the supports e, bearings f, and shoulders m m are preferably made of one piece of metal, though I do not limit myself in this respect.

By means of my improvement the side bars have a sufficient motion upon their supports to relieve the fastenings from the great and constant strain which they are subjected to while in motion in cases where the couplings are rigid—i. e., where the side bars are rigidly secured to their supports—and hence the frequent breaking of bolts or loosening of the nuts, &c., is avoided, as will be obvious.

Having thus described my invention, what I claim as new is—

1. The improved side-bar coupling herein described, consisting of a support having an oval or rounded bearing and shoulders at the extremities thereof and adapted to be secured to the axle, bed, or bolster of a carriage, separable boxes having a seat corresponding with said bearing and adapted to be secured to the side bars of said carriage, and means for fastening said boxes together and the coupling to the carriage, as and for the purposes set forth.

2. The combination, with the axle, bed, or bolster, of supports, each provided with clips at one end for securing it in place and having its opposite end provided with a bearing and a shoulder at each end of the bearing, the portion of the support between the bearing and the clips being curved upwardly and outwardly, a separable box for each bearing of the same width as the length of the bearing, whereby lateral movement is prevented, a side bar for connecting the supports upon one side of the vehicle, and means at each bearing for securing the separable boxes together and to the side bar, substantially as described.

3. The combination, with the axle, bed, or bolster and the side bar of a carriage, of a support provided with shoulders and adapted to be secured to said axle, bed, or bolster and having an oval or rounded bearing, and separable boxes adapted to be secured to said side bar, having a seat corresponding with said bearing, as described, for securing said parts to one another, and two bolts connected together at one end by an oblong plate or head and provided at the other with nuts, as and for the purposes set forth.

In testimony that I claim the foregoing I have hereunto set my hand this 20th day of August, 1891.

GEORGE H. CANFIELD.

Witnesses:
OLIVER DRAKE,
OSCAR A. MICHEL.